United States Patent
McCrory et al.

(10) Patent No.: US 10,706,110 B2
(45) Date of Patent: Jul. 7, 2020

(54) SYSTEMS AND METHODS FOR AN INFORMATION STORAGE AND RETRIEVAL SYSTEM FOR AN ELECTRONIC DOCUMENT INTERCHANGE (EDI) ENVIRONMENT

(71) Applicant: Walmart Apollo, LLC, Bentonville, AR (US)

(72) Inventors: Jason Paul McCrory, Bentonville, AR (US); Ted Sherrill, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 190 days.

(21) Appl. No.: 16/015,790

(22) Filed: Jun. 22, 2018

(65) Prior Publication Data

US 2018/0373712 A1    Dec. 27, 2018

Related U.S. Application Data

(60) Provisional application No. 62/523,345, filed on Jun. 22, 2017.

(51) Int. Cl.
| | |
|---|---|
| *G06F 16/93* | (2019.01) |
| *G06F 16/13* | (2019.01) |
| *G06F 16/14* | (2019.01) |
| *G06F 16/185* | (2019.01) |

(Continued)

(52) U.S. Cl.
CPC .............. *G06F 16/93* (2019.01); *G06F 16/13* (2019.01); *G06F 16/148* (2019.01); *G06F 16/185* (2019.01); *G06F 16/2282* (2019.01); *G06F 16/2453* (2019.01)

(58) Field of Classification Search
None
See application file for complete search history.

(56) References Cited

U.S. PATENT DOCUMENTS

| | | |
|---|---|---|
| 5,557,780 A | 9/1996 | Edwards et al. |
| 7,069,500 B2 | 6/2006 | Aoyama et al. |
| 7,472,083 B2 | 12/2008 | Schleicher |

(Continued)

OTHER PUBLICATIONS

International Search Report and Written Opinion from related International Patent Application No. PCT/US2018/039076 dated Sep. 17, 2018.

*Primary Examiner* — Wilson Lee
(74) *Attorney, Agent, or Firm* — McCarter & English, LLP; David R. Burns

(57) ABSTRACT

Described in detail herein are systems and methods a data repository for an Electronic Document Interchange (EDI) system. A data repository management system can receive from a party system, at least one EDI document type, information associated with the third party system, a first set of data requests and a first set of data responses. The data repository management system can be operatively coupled to a data repository including a master self-referential table defining a hierarchy for the data repository. The data repository can further include a child table, a first sub-child table and a second sub-child table. The data repository management system can generate a rows in the master self-relational table, child table, first sub-child table and second sub-child table to store the information associated with the third party system and an associated EDI document.

20 Claims, 17 Drawing Sheets

(51) Int. Cl.
    *G06F 16/22*       (2019.01)
    *G06F 16/2453*    (2019.01)

(56) References Cited

U.S. PATENT DOCUMENTS

| | | |
|---|---|---|
| 7,703,099 B2 | 4/2010 | Gaurav et al. |
| 2003/0046639 A1 | 3/2003 | Fai et al. |
| 2006/0277205 A1* | 12/2006 | Song ................... G06N 5/02 |
| 2007/0027887 A1* | 2/2007 | Baldwin ............... G06F 40/35 |
| 2007/0233691 A1 | 10/2007 | Chaushev |
| 2008/0059500 A1* | 3/2008 | Symens ............... G06Q 10/10 |
| 2008/0071806 A1 | 3/2008 | Gaurav et al. |
| 2008/0168081 A1 | 7/2008 | Gaurav et al. |
| 2008/0181516 A1* | 7/2008 | Jackson ................ G06F 16/25 |
| | | 382/236 |
| 2011/0173214 A1* | 7/2011 | Karim .................. G06F 16/489 |
| | | 707/754 |
| 2012/0023012 A1 | 1/2012 | Brousseau |
| 2017/0024836 A1* | 1/2017 | Jackson ................. H04L 51/36 |
| 2017/0103230 A1* | 4/2017 | O'Brien ............... G06F 21/6245 |

\* cited by examiner

SYSTEMS AND METHODS FOR AN INFORMATION STORAGE AND RETRIEVAL SYSTEM FOR AN ELECTRONIC DOCUMENT INTERCHANGE (EDI) ENVIRONMENT

CROSS-REFERENCE TO RELATED PATENT APPLICATION

This application claims priority to U.S. Provisional Application No. 62/523,345 filed on Jun. 22, 2017, the content of the application is hereby incorporated by reference in its entirety.

BACKGROUND

Receiving, verifying, and completing data transactions between two entities can be complicated and prone to numerous errors.

BRIEF DESCRIPTION OF DRAWINGS

Illustrative embodiments are shown by way of example in the accompanying drawings and should not be considered as a limitation of the present disclosure. The accompanying figures, which are incorporated in and constitute a part of this specification, illustrate one or more embodiments of the disclosure and, together with the description, help to explain the invention. In the figures.

DETAILED DESCRIPTION

Figure 1:
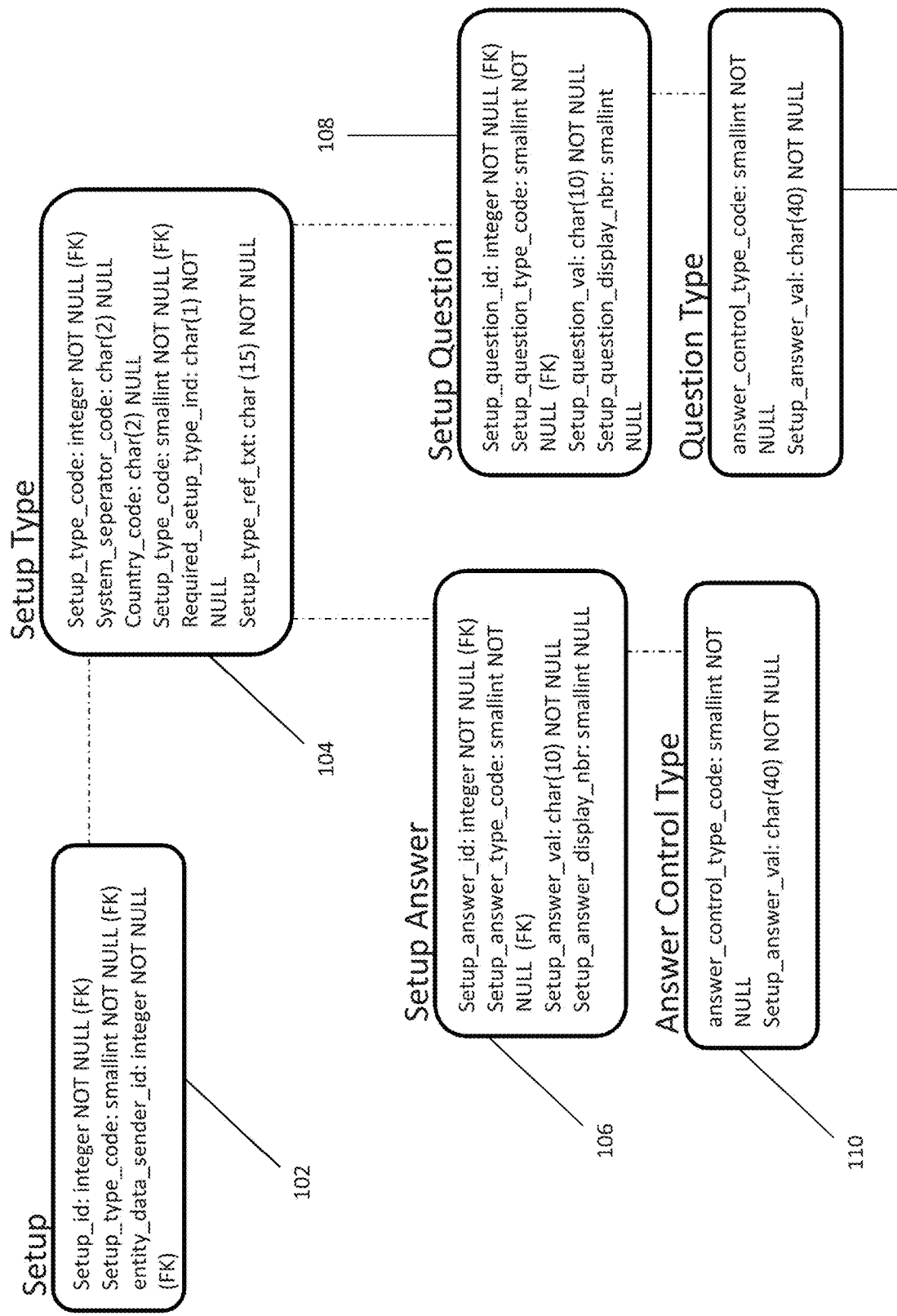
FIG. 1 is a schematic diagram of data repository in an example information storage and retrieval system according to an exemplary embodiment.

Described in detail herein are information storage and retrieval systems and methods for an Electronic Document Interchange (EDI) environment. The disclosed systems and methods provide an information storage and retrieval system that effectively store third party information associated with EDI documents in a scalable and hierarchical database architecture without requiring the creation of new data tables when a new data and data types are added to the database. The disclosed system receives EDI document setup information from various third party systems. The EDI document setup information along with the third party information can be stored in rows of existing data tables of a data repository management system. Rather than creating new tables, the disclosed system can store and retrieve the EDI document information from existing tables for each third party system. The disclosed system provides the technical solution of reducing the amount of memory required to store EDI document information along with reducing retrieval time, by simplifying queries as the same tables can be queried each time since there new tables are not created.

A data repository management system of the information storage and retrieval system can receive, from a party system, at least one EDI document type, information associated with the third party system, a first set of data requests and a first set of data responses. The data repository management system of the information storage and retrieval system can be operatively coupled to a data repository to create, maintain, and update a master self-referential table data structure. The master self-referential table data structure can define a hierarchy for the data repository and can include rows, where each row corresponds to a third party system.

The data repository management system can be operatively coupled to the data repository to create, maintain, and update child table data structures that reference the master-self relational table data structure and are configured to store EDI document types corresponding to each of the third party systems. The data repository created, maintained, and/or updated by the data repository management system to include sub-child table data structures. A first sub-child table data structure can reference at least one of the child table data structures and can be configured to store data requests corresponding to each of the EDI document types and each of the third party systems. A second sub-child table data structure can reference the at least one of the child table data structures and can be configured to store data responses corresponding to each of the EDI document types and each of the third party systems.

The data repository management system can generate rows in the master self-relational table data structure to store the information associated with the third party systems, and can map at least one of the EDI document types stored in the at least one of the child table data structures with the third party information in the master self-referential table data structure. The data repository management system can associate the first set of data requests stored in the first sub-child table data structure with the at least one EDI document type stored in the at least one of the child table data structures and third party information of at least one of the third party system stored in the master self-referential master table data structure to define columns in the first sub-child table data structure. The data repository management system can associate the first set of data responses stored in the second sub-child table data structure with the at least one EDI document type and the third party information of the at least one third party system to define columns in the second sub-child table data structure.

The data repository management system of the information storage and retrieval system can receive a request for a EDI document type from a third party system, and can retrieve the third party information from the master self-referential table data structure. The data repository management system can retrieve the at least one EDI document type based on the hierarchy, the third party information from the at least one of the child table data structures, and the columns defined in the first and second sub-child table data structures. The data repository management system can retrieve the first set of data requests associated with at least one EDI document type and the at least one third party information from the first sub-child table data structure. The data repository management system retrieve the first set of data responses associated with at least one EDI document type and the at least one third party information from the second sub-child table data structure.

In some embodiments, in response to associating the first set of data responses, an EDI document type and third party information, the data repository management system can be configured to determine a second set of data responses and/or data requests are necessitated by the first set of data responses, and can associate the second set of data responses with the EDI document type and the third party information. The data repository can be configured to determine a second set of data requests and/or data responses are necessitated by the first set of data responses, and can associate the second set of data requests with the EDI document type and the third party information.

The information storage and retrieval system can include a central computing system operatively coupled to the data repository. The central computing system can render graphical user interfaces on a third party system, and the data repository management system can be configured to receive the EDI document type, the information associated with the third party system, the first set of data requests and the first set of data responses, via the graphical user interfaces, for storage in or retrieval from the data repository. The central computing system can render the first set of data requests and responses on the graphical user interfaces in response to the data repository management system retrieving the first set of data requests and responses from the data repository. The data repository management system can be configured to receive a query, retrieve data associated with the query from the data repository based on the hierarchy and the columns defined in the first and second sub-child tables, and generate a file storing the retrieved data.

FIG. 1 is a schematic diagram of a portion of a data repository 100 that can be created, maintained, and updated by an information storage and retrieval system according to an exemplary embodiment of the present disclosure. The data repository 100 can be configured to store EDI document information. The data repository 100 can include a master self-referential table 102 defining a hierarchy for the data repository 100, a child table 104, a first sub-child table 106 and a second child table 108. Each of the tables can include multiple columns and each column can include multiple different rows corresponding to third party systems. A self-referential table is a table in a data repository in which a foreign key points to the primary key in the same table. A self-referential table can be used to store non-hierarchical and/or hierarchical data relationships within the table. The master self-referential table 102 can include rows in which each row can correspond to third party systems. The child table 104 can reference the master self-referential table 102 and can be configured to store EDI document types corresponding to each third party system in the master self-referential table 102. The first sub-child 106 table can reference the child table 104 and can be configured to store data requests corresponding EDI document types and each of the plurality of third party systems. The second sub-child table 108 can reference the child table 104 and can be configured to store data responses corresponding to each of the EDI document types and each the third party systems.

As a non-limiting example, the master self-referential table 102 can be a "Setup" table which includes columns including "Setup_id," "Setup_type_code," and "Entity_data_sender_id." Each of the columns can correspond to multiple rows in the master self-referential table. The rows can include data associated with third party systems. For example, a third party system can access the data repository 100 (via the one or more GUIs that interface with the repository management system of the information storage and retrieval system) to provide data to setup a new EDI document. The "Setup" table 102 can store the data in a row, which can include third party system information and/or an EDI document type of the new EDI document.

The third party system can be prompted (via GUIs) to provide additional information to be stored in the row of the "Setup" table 102. The additional information can include, an EDI document type, country code, and other information associated with the EDI document. The additional information can be stored in a row of the child table 104. The child table 104 can be a "Setup Type" table which includes columns, such as, for example, "Setup_type_code," "System_seperator_code," "Country_code," "Setup_type_code," "Required_setup_type_ind," and "Setup_type_ref_txt." Each EDI document type can correspond to a set of data requests and a set of data responses. The third party system can be prompted to select data requests from the set of data requests associated with the EDI document information stored in the child table 104 and select data responses from the set of data responses associated with the EDI document information stored in the child table 104. The selected data requests can be stored in rows of the first sub-child table 106, which can be a "Setup Answer" table that includes columns, such as, for example, "Setup_answer_id," "Setup_answer_type_code," "Setup_answer_val," and "Setup_answer_display_nbr." The data responses can be stored in rows of the second sub-child table 108, which can be a "Setup Question" table that includes columns, such as, for example, "Setup_question_id," "Setup_question_type_code," "Setup_question_val," and "Setup_question_display_nbr."

The EDI document type can be correlated and stored in the child table 104, with the third party information stored in the master self-referential table 102. The selected data requests stored in the first sub-child table 106 can be associated with the EDI document type stored in the child table 104. The selected data responses stored in the second sub-child table 108 can be associated with the EDI document type stored in the child table 104. Third party information can define a column in the first and second sub-child table 106-108.

For example, the child table can include multiple EDI document types. A row can be generated in the child table storing the third party information which refers back a unique id associated with the third party information stored in the master self-referential table. Binary values of true and false can be associated with the EDI document types in the child tables. The binary values associated with the EDI documents types which are not associated with the specific third party information can be marked as false, and the binary values associated with the EDI document types which are associated with the specific third party information can be marked as true.

Continuing with the above example, the first sub-child table can include multiple data requests. A row can be generated in the first sub-child table storing the third party information and EDI document type, which refers back a unique id associated with the third party information stored in the master self-referential table and the associated EDI document type stored in the child table. Binary values of true and false can be associated with the data requests. The binary values associated with the data requests which are not associated with the specific third party information and EDI document type can be marked as false, and the binary values associated with the data requests which are associated with the specific third party information and EDI document type can be marked as true. In some embodiments, in response to detecting a specific EDI document type, binary values associated with certain data requests can automatically be marked as false and/or true, since certain EDI documents types require certain data requests and other data requests are not applicable to the EDI document type.

Continuing with the above example, the second sub-child table can include multiple data responses. A row can be generated in the first sub-child table storing the third party information and EDI document type, which refers back a unique id associated with the third party information stored in the master self-referential table and the associated EDI document type stored in the child table. Binary values of true and false can be associated with the data responses. The binary values associated with the data responses which are not associated with the specific third party information and EDI document type can be marked as false, and the binary values associated with the data responses which are associated with the specific third party information and EDI document type can be marked as true. In some embodiments, in response to detecting a specific EDI document type, binary values associated with certain data responses can automatically be marked as false and/or true, since certain EDI documents types require certain data requests and other data response are not applicable to the EDI document type.

In some embodiments, the selected data requests and data responses can necessitate additional data request and data responses. Furthermore, the selected data requests and data responses can necessitate additional information associated with the data requests and data responses. For example, a data response can be a measurement and the third party system can be prompted to provide additional information associated with the units of the measurement. The additional information associated with the data requests can be stored in can be stored in the "Answer Control Type" table 110 and the "Question Control Type" table 112, respectively.

Figure 2:
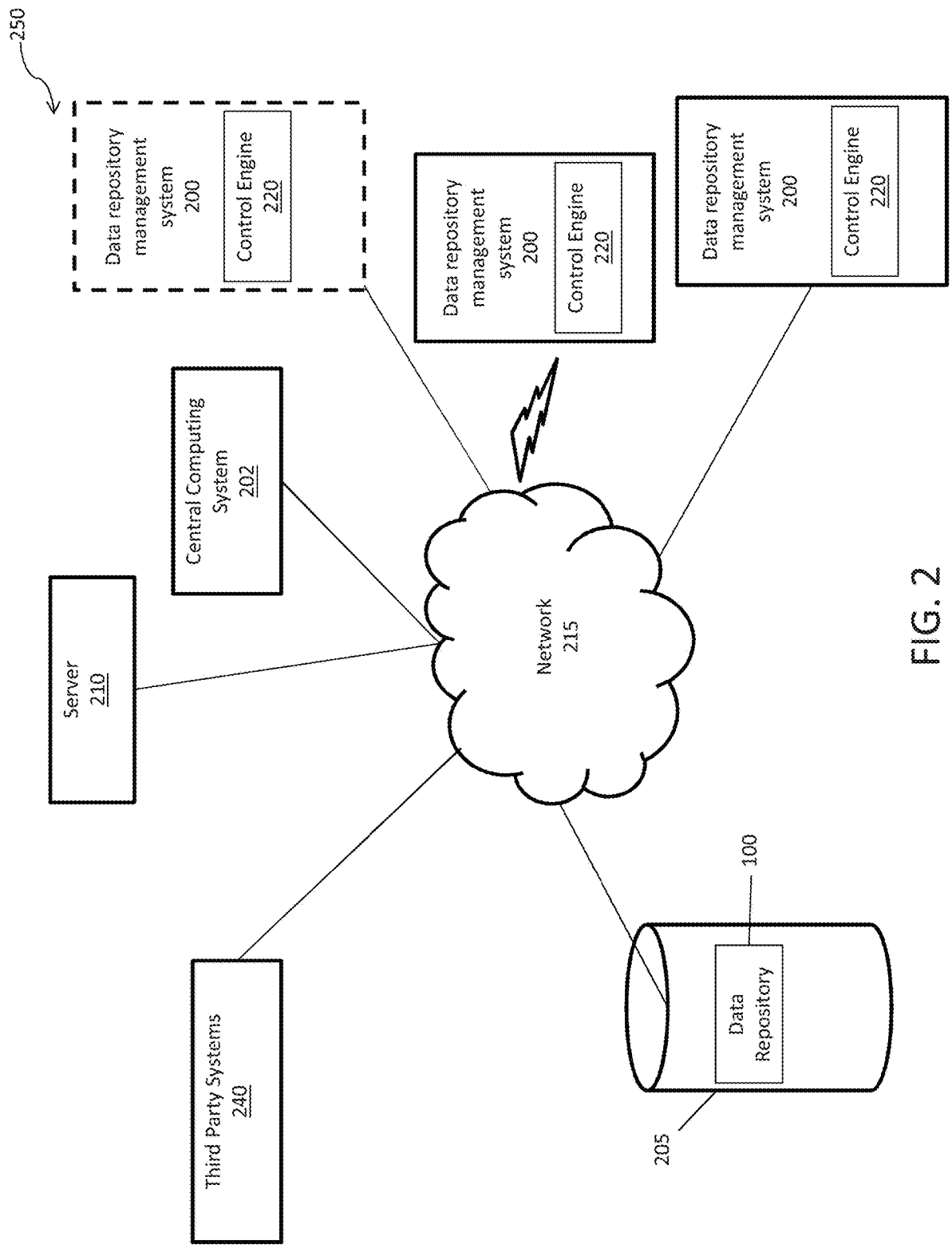
FIG. 2 illustrates a network diagram of an information storage and retrieval system for an Electronic Document Interchange (EDI) environment in accordance with an exemplary embodiment.

FIG. 2 illustrates a network diagram of an information storage and retrieval system 250 for an Electronic Document Interchange (EDI) environment, in accordance with an exemplary embodiment of the present disclosure. The system 250 can include one or more databases 205, one or more database management systems 200, and one or more central computing systems 202 for interacting with one or more third party systems 240 over communication network 215. The databases 205 can include a data repository 100 as described above, with reference to FIG. 1. The computing system 200 can execute one or more instances of a control engine 220. The control engine 220 can be an executable application in the data repository management system 200 to create, maintain, and update the data repository 100 of the system 250 as described herein.

In an example embodiment, one or more portions of the communications network 215 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The data repository management system 200 can include one or more computers or processors configured to communicate with the databases 205, central computing systems 202, and third party systems 240 via the network 215. The computing system 200 hosts one or more applications configured to interact with one or more components of the system 250. The databases 205 may store information/data, as described herein. For example, the databases 505 can include a data repository 100 including EDI information associated with third party systems. The databases 205 can be located at one or more geographically distributed locations from the data repository management system 200. Alternatively, the databases 205 can be included within the data repository management system 200.

In one embodiment, the central computing system 202 can generate a graphical user interface (GUI), which can be rendered on a display of the third party system 240. The GUI can be embodied as an EDI portal for interfacing with the system 250. The GUI can prompt the third party system 240 to input a new EDI setup. The third party setup can input, an EDI document type, and information associated with the third party system. The GUI can transmit the input EDI document type and information associated with the third party system to the data repository management system 200. The data repository management system 200 can execute the control engine 220 in response to receiving the input information. The control engine 220 can generate a new row in the master self-referential table of the data repository 100 to store the EDI document type and information associated with the third party system in the master self-referential table of the data repository 100.

The control engine 220 can determine a child table referencing the master self-referential table in the data repository 100. The control engine 220 can instruct the central computing system 202 to prompt the third party system 240, via the GUI, to input information associated with columns in the child table based on the EDI document type and information associated with the third party system 240. For example, the GUI can prompt the third party system to input further information associated with the EDI document type and information associated with the third party system. The GUI can transmit the input of the additional information associated with the EDI document type and information associated with the third party system to the data repository management system 200. The control engine 220 can generate a row in the child table of the data repository 100 to store the additional information associated with the EDI document type and third party system. The control engine 220 can associate the additional information associated EDI document type and third party system 240 to the EDI document type and information associated with the third party system stored in the master self-referential table in the data repository 100.

The control engine 220 can determine a first sub-child table based on the EDI document type, the information associated with the third party system and the additional information associated with the EDI document type and third party system. The first sub-child table can include columns associated with data requests which are associated with different types of EDI documents for different third party systems 240. The control engine 220 can determine the data requests which are associated with the selected type of EDI document and the third party system 240. The control engine 220 can instruct the central computing system 202 to prompt the third party system 240, via the GUI, to input information associated with columns in the first sub-child table in the data repository 100, based on the EDI document type, information associated with the third party system, and additional information associated EDI document type and third party system 240. The third party system 240 can input a selection of data requests. The GUI can transmit the selected data requests to the data repository management system 200. The control engine 220 can generate a row for the selected data requests in the first sub-child table. The control engine 220 can associate the selected data requests stored in the first sub-child table to the EDI document type and information associated with the third party system stored in the master self-referential table and the additional information associated with the EDI document type and third party stored in the child table, in the data repository 100.

The control engine 220 can determine a second sub-child table based on the EDI document type, the information associated with the third party system and the additional information associated with the EDI document type and third party system. The second sub-child table can include columns associated with data responses which are associated with different types of EDI documents for different third party systems 240. The control engine 220 can determine the data responses which are associated with the selected type of EDI document and the third party system 240. The control engine 220 instruct the central computing system 202 to prompt the third party system 240, via the GUI, to input information associated with columns in the second sub-child table in the data repository 100 based on the EDI document type, information associated with the third party system, and additional information associated EDI document type and third party system 240. The third party system 240 can input a selection of data responses. The GUI can transmit the selected data responses to the data repository management system 200. The control engine 220 can generate a row for the selected data responses in the second sub-child table. The control engine 220 can associate the selected data responses stored in the second sub-child table to the EDI document type and information associated with the third party system stored in the master self-referential table and the additional information associated with the EDI document type and third party stored in the child table, in the data repository 100. In some embodiments, the control engine 220 can instruct the central computing system 202 to prompt the third party system 240, via the GUI, to select/input additional data responses and/or requests necessitated by the selection of certain data requests and/or responses.

The data repository management system 200 can receive a request from the third party system 240 to retrieve an EDI document from the data repository. The control engine 220 can query the master self-referential table to retrieve the row from the master self-referential table storing the EDI document type and information associated with the third party information. The control engine 220 can query the child table to retrieve the row in the child table storing the additional information associated with EDI document type and third party information, based on the EDI document type and information associated with the third party information stored in the row retrieved from the master self-referential table. The control engine 220 can query the first sub-child table to retrieve the row in the first sub-child storing the data requests, based on the EDI document type and information associated with the third party information stored in the master self-referential table and additional information associated with EDI document type and third party information stored in the child table. The control engine 220 can query the second sub-child table to retrieve the rows in the second sub-child table storing the data responses, based on the EDI document type and information associated with the third party information stored in the master self-referential table and additional information associated with EDI document type and third party information stored in the child table. The control engine 220 can instruct the central computing system 202 to display the EDI document type and information associated with the third party information stored in the master self-referential table, additional information associated with EDI document type and third party information stored in the child table, the data requests and data responses, on the GUI.

As a non-limiting example, the system 250 can be embodied in a retail environment. The central computing system 202 and the data repository management system 200 can be associated with a retailer. The third party systems 240 can be vendors and/or suppliers. The vendors and/or suppliers can access the EDI portal to exchange and/or interchange various types of electronic documents with a retailer. The documents can be one or more of: purchase orders, invoices, ASNs, REACT documents, SAMS documents, RPO SAMS documents, Product Activity documents, and Product Activity in Warehouses documents.

The third party system 240 can use an authentication mechanism to access the EDI portal. A helper class data structure can be used to get an authenticated user ID and access groups to which the user belongs. Once a session object between the third party system 240 and the EDI portal is established, the contents of the session object are persisted across post backs through storing session contents (binary serialized and encrypted through TripleDES) in a hidden variable. An EDIController class data structure, which is the parent class of every controller, in its action executing function, ActionExecuting( ) reads the hidden variable and de-serializes the encrypted content back to a session object. The contents can be included in View Data for the controller and view to use.

Figure 3:
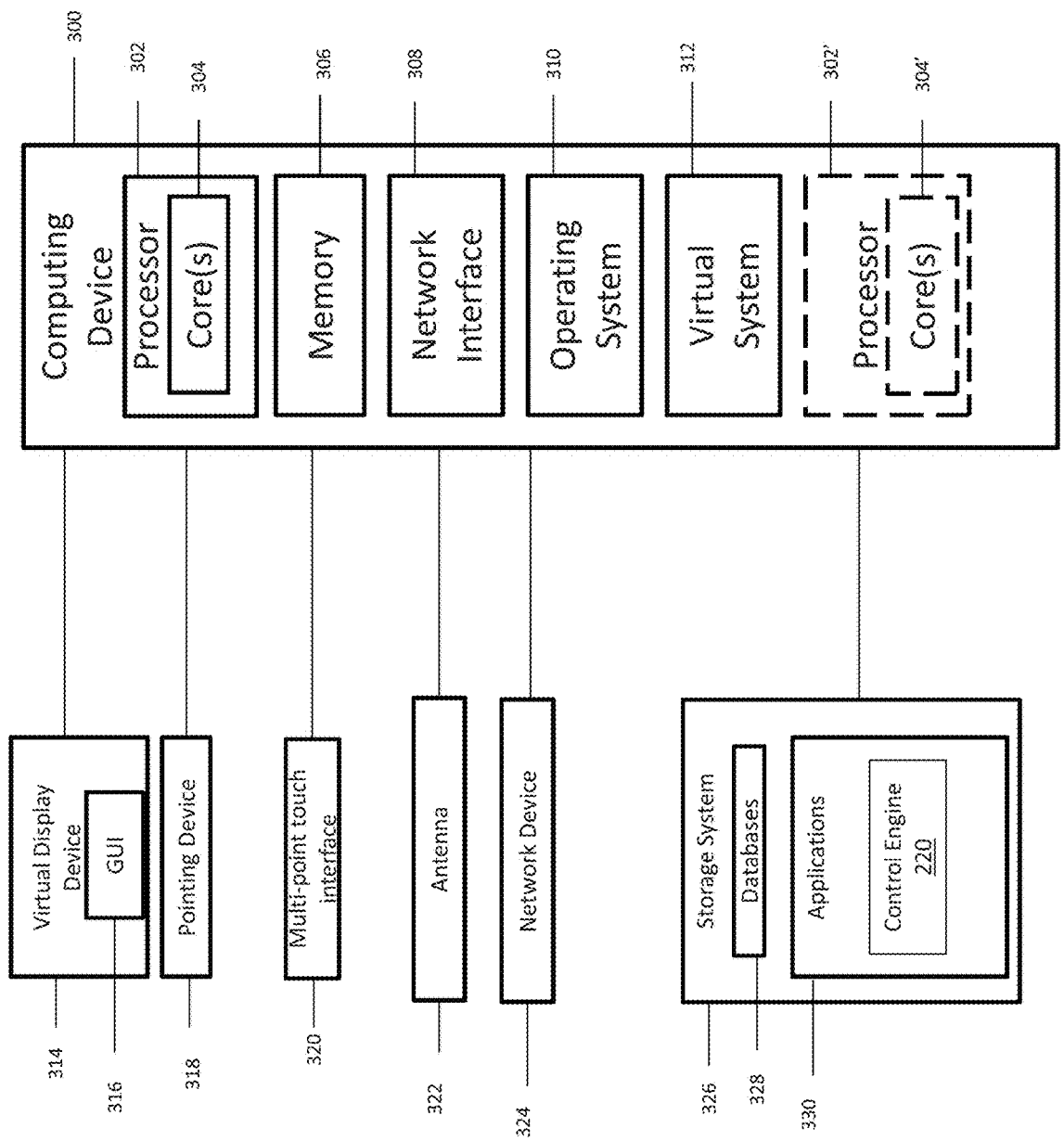
FIG. 3 illustrates a block diagram an exemplary computing device in accordance with an exemplary embodiment.

FIG. 3 is a block diagram of an exemplary computing device suitable for implementing embodiments of the augmented touch-sensitive display system. The computing device may be, but is not limited to, a smartphone, laptop, tablet, desktop computer, server or network appliance. The computing device 300 can be embodied as the data management system, central computing system and/or the third party system shown in FIG. 2. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in the computing device 300 may store computer-readable and computer-executable instructions or software (e.g., applications 330 such as the control engine 220) for implementing exemplary operations of the computing device 300. The computing device 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for implementing exemplary embodiments of the present disclosure. Processor 302 and processor(s) 302' may each be a single core processor or multiple core (304 and 304') processor. Either or both of processor 302 and processor(s) 302' may be configured to execute one or more of the instructions described in connection with computing device 300.

Virtualization may be employed in the computing device 300 so that infrastructure and resources in the computing device 300 may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof. The computing device 300 can receive data from input/output devices such as, a reader 334 and an image capturing device 332.

A user may interact with the computing device 300 through a visual display device 314, such as a computer monitor, which may display one or more graphical user interfaces 316, multi touch interface 320 and a pointing device 318.

The computing device 300 may also include one or more storage devices 326, such as a hard-drive, CD-ROM, or other computer readable media, for storing data and computer-readable instructions and/or software that implement exemplary embodiments of the present disclosure (e.g., applications such as the control engine 220). For example, exemplary storage device 326 can include one or more databases 328 for storing information regarding third party systems and EDI document types. The databases 328 may be updated manually or automatically at any suitable time to add, delete, and/or update one or more data items in the databases. The databases 328 can be embodied as the data repository and include information associated with EDI documents associated with third party systems.

The computing device 300 can include a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 322 to facilitate wireless communication (e.g., via the network interface) between the computing device 300 and a network and/or between the computing device 300 and other computing devices. The network interface 308 may include a built-in network adapter, network interface card, PCMCIA network card, card bus network adapter, wireless network adapter, USB network adapter, modem or any other device suitable for interfacing the computing device 300 to any type of network capable of communication and performing the operations described herein.

The computing device 300 may run any operating system 310, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 300 and performing the operations described herein. In exemplary embodiments, the operating system 310 may be run in native mode or emulated mode. In an exemplary embodiment, the operating system 310 may be run on one or more cloud machine instances.

Figure 4:
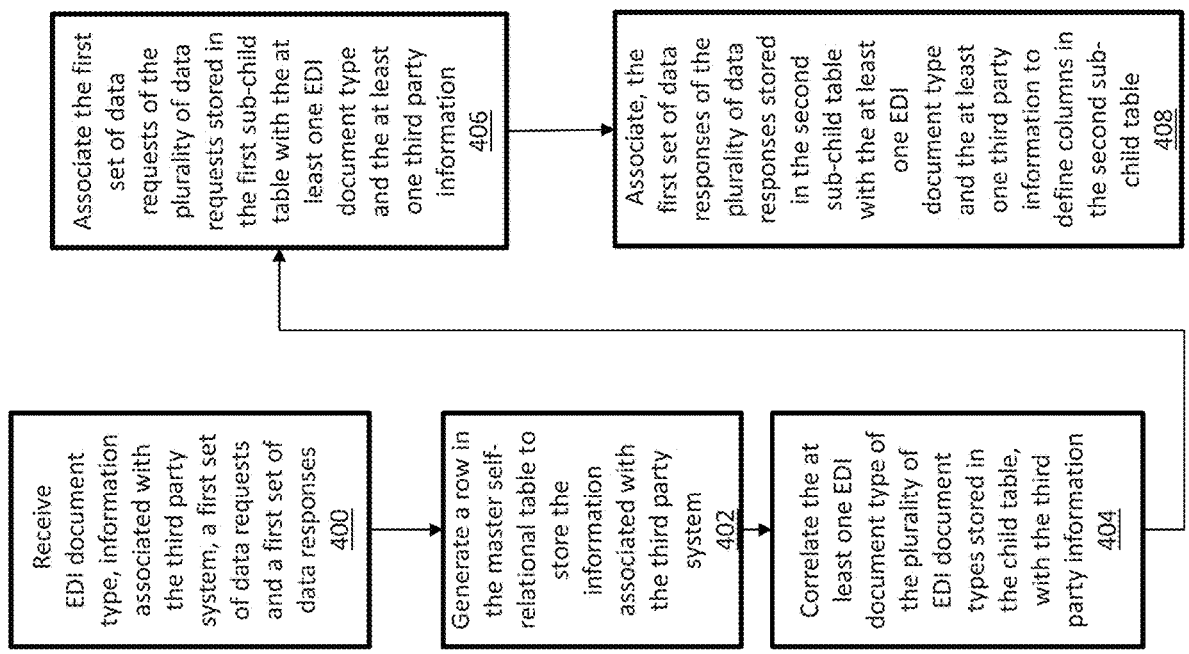
FIG. 4 is a flowchart illustrating a process implemented by an information storage and retrieval system for an EDI environment according to an exemplary embodiment.

FIG. 4 is a flowchart illustrating a process implemented by an embodiment of the information storage and retrieval system for an EDI environment according to an exemplary embodiment of the present disclosure. In operation 400, a data repository management system (e.g. data repository management system 200 as shown in FIG. 2) can receive from a third party system (e.g. third party system 240 as shown in FIG. 2), at least one EDI document type, information associated with the third party system, a first set of data requests and a first set of data responses. The data repository management system can be operatively coupled to a data repository (e.g. data repository 100 as shown in FIG. 1) including a master self-referential table (e.g. master self-referential table 102 as shown in FIG. 1) defining a hierarchy for the data repository. The master self-referential table includes plurality of rows, each row corresponding to a third party system (e.g. third party system 240 as shown in FIG. 2). The data repository also includes at least one child table (e.g. child table 104 as shown in FIG. 1) which references the master-self relational table and is configured to store a plurality of EDI document types corresponding to each of the third party systems. The data repository also includes a first sub-child table (e.g. first sub-child table 106 as shown in FIG. 1). The first sub-child table references the child table and is configured to store data requests corresponding to each of the EDI document types and each of the third party systems. The data repository also includes a second sub-child table (e.g. second sub-child table 108 as shown in FIG. 1). The second sub-child table references the child table and is configured to store data responses corresponding to each of the EDI document types and each of the third party systems.

In operation 402, the data repository management system can generate a row in the master self-relational table to store the information associated with the third party system. In operation 404, the data repository management system can correlate the at least one EDI document type of the plurality of EDI document types stored in the child table, with the third party information. In operation 406, the data repository management system can associate the first set of data requests of the plurality of data requests stored in the first sub-child table with the at least one EDI document type and the at least one third party information to define columns in the first sub-child table. In operation 408, the data repository management system can associate, the first set of data responses of the plurality of data responses stored in the second sub-child table with the at least one EDI document type and the at least one third party information to define columns in the second sub-child table.

Figure 5:
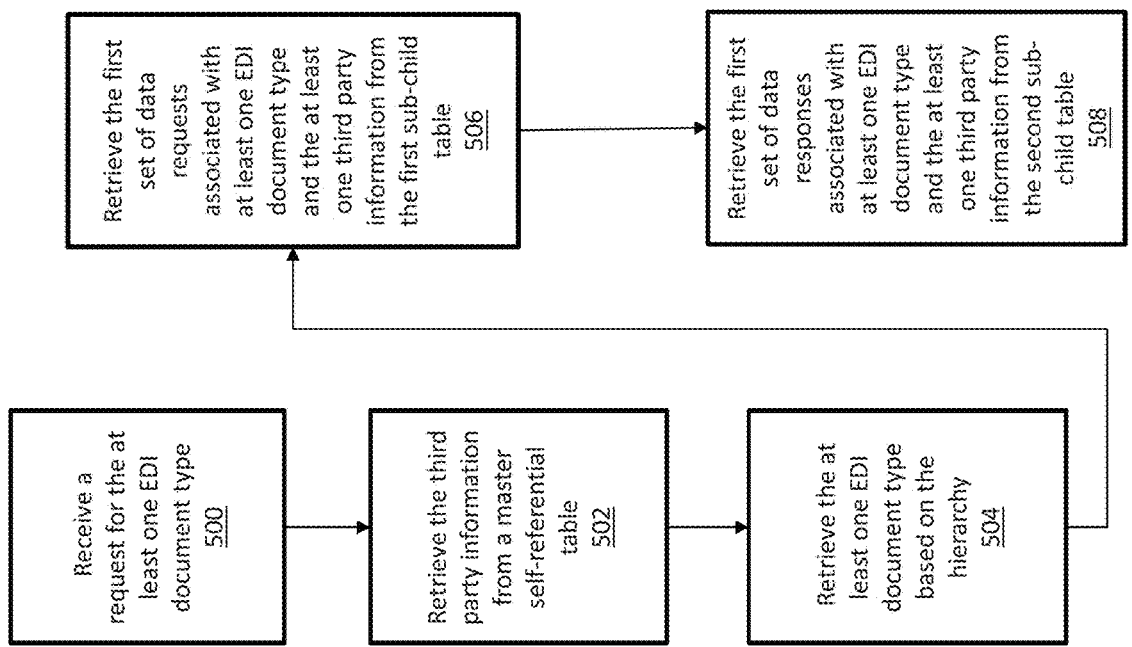
FIG. 5 is a flowchart illustrating an exemplary process of retrieving an EDI document from an example information storage and retrieval system in accordance with an exemplary embodiment of the present disclosure.

FIG. 5 is a flowchart illustrating an exemplary process of retrieving an EDI document in an embodiment of the information storage and retrieval system in accordance with an exemplary embodiment of the present disclosure. In operation 500, a data repository management system can receive a request for the at least one EDI document type from a third party system (e.g. third party system 240 as shown in FIG. 2). In operation 502, the data repository management system can retrieve the third party information from a master self-referential table (e.g. master self-referential table 102 as shown in FIG. 1). In operation 504, the data repository management system can retrieve the at least one EDI document type based on the hierarchy, the third party information from the child table (e.g. child table 104 as shown in FIG. 1), and the columns defined in the first and second sub-child tables (e.g. first and second sub-child tables 106-108 as shown in FIG. 1). In operation 506, the data repository management system can retrieve the first set of data requests associated with at least one EDI document type and the at least one third party information from the first sub-child table. In operation 508, the data repository management system retrieve the first set of data responses associated with at least one EDI document type and the at least one third party information from the second sub-child table.

Figure 6:
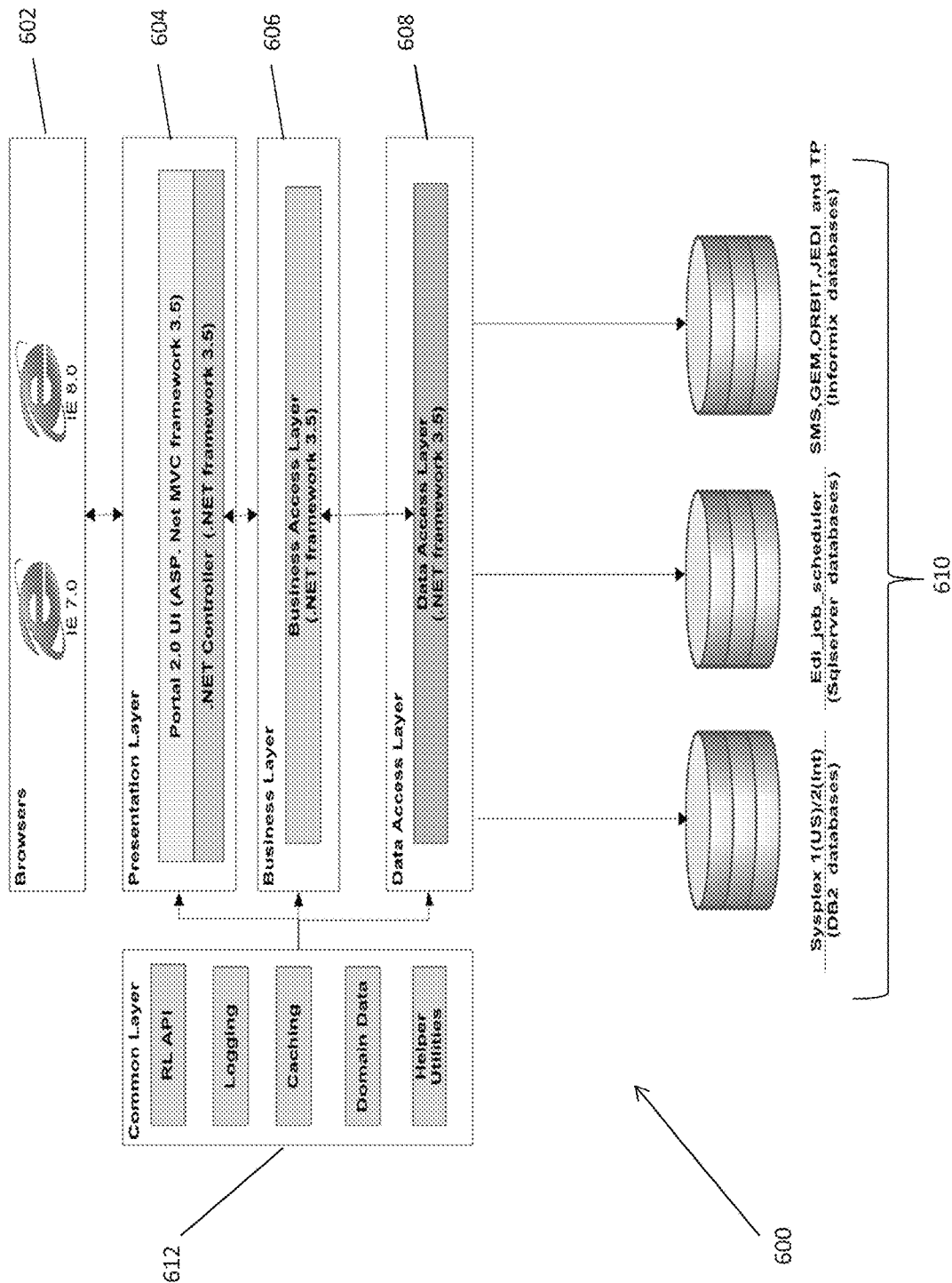
FIG. 6 is an exemplary architecture of the EDI portal for interfacing with the information storage and retrieval system according to an exemplary embodiment of the present disclosure.

FIG. 6 is a block diagram illustrating an exemplary architecture of the EDI portal for interfacing embodiments of the data repository management system according to an exemplary embodiment of the present disclosure. The architecture 600 can include a client layer 602 including supported web browsers (e.g., Internet Explorer 7.0/8.0 with a JQuery/Javascript/Knockout plug-in). The client layer 602 can support an authentication data storage. The browser can support cookies and the cookies option can be enabled in the architecture 600. It can be appreciated the client layer 602 can support various browsers such as Mozilla Firefox, Google Chrome, Safari, Opera, Microsoft Edge, Microsoft Internet Explorer, and other internet browsers. The architecture 600 can further include a presentation layer 604 coupled to the client layer 602. The presentation layer 604 can be implemented as a view and controller component of a Model-View-Controller (MVC) architectural pattern. Based on user action, a controller can call the model and return the appropriate view. The EDI portal can use strongly-typed view data. The view can include HTML rendering logic based on requirements and JQuery script.

The architecture 600 can further include a business layer 606. The business layer 606 can include business validation and rules. The controller (in the presentation layer 604) can call the business access layer/service agent components. Business access layer within the business layer 606, creates the instance of a dataaccess layer 608, using an abstract factory pattern. An service agent component can call the mainly external web services.

The architecture 600 further includes data access layer 608. The EDI portal can access the different databases like Informix, SQL Server (Via RL API), and DB2. The data access layer 608 can facilitate the database calls with correct .Net protocols/providers. The data access layer 608 internally calls the central computing system's (e.g. central computing system 200 as shown in FIG. 2) generic data access layer. The architecture 600 further includes common components 612. The common compoenents can include, RL API, Domain Data, Error Logging, Caching, and helper utilities. The domain data represents the model/structures of data and facilities to transport the data across the presentation, business and data access layer 604-608. The architecture 600 can include multiple databases 610. The databases can include a DB2 database, a SQLServer database, and Informix database. The data repository (e.g. data repository 100 as shown in FIGS. 1-2) can be included in, for example, the Informix database.

Figure 7:
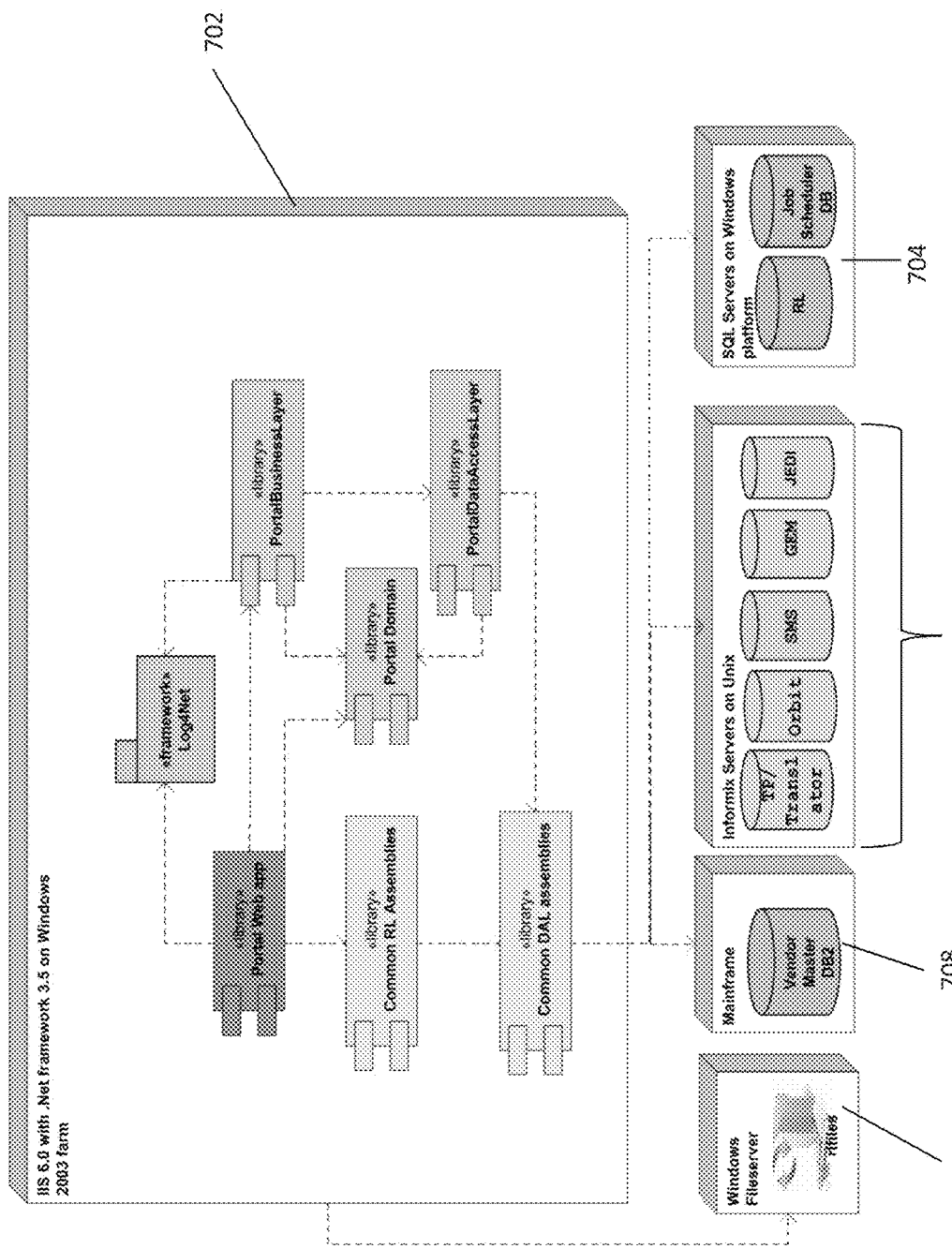
FIG. 7 is a component diagram of the EDI portal for the information storage and retrieval system according to an exemplary embodiment of the present disclosure.

FIG. 7 is a component diagram of the EDI portal for interfacing with embodiments of the information storage and retrieval system according to an exemplary embodiment of the present disclosure. The EDI portal can include multiple libraries 702. The libraries can include a Log4net library, PortalBusinessLayer library, PortalWebApp library, Common RL Assemblies library, the Portal Domain library, PortalDataAccessLayer library, and the Common DAL Assemblies. The libraries 702 can communicate with a fileserver 710. The Common DAL Assemblies can communicate with the mainframe 708, Informix servers 706, and the SQL Serves 704.

Figure 8:
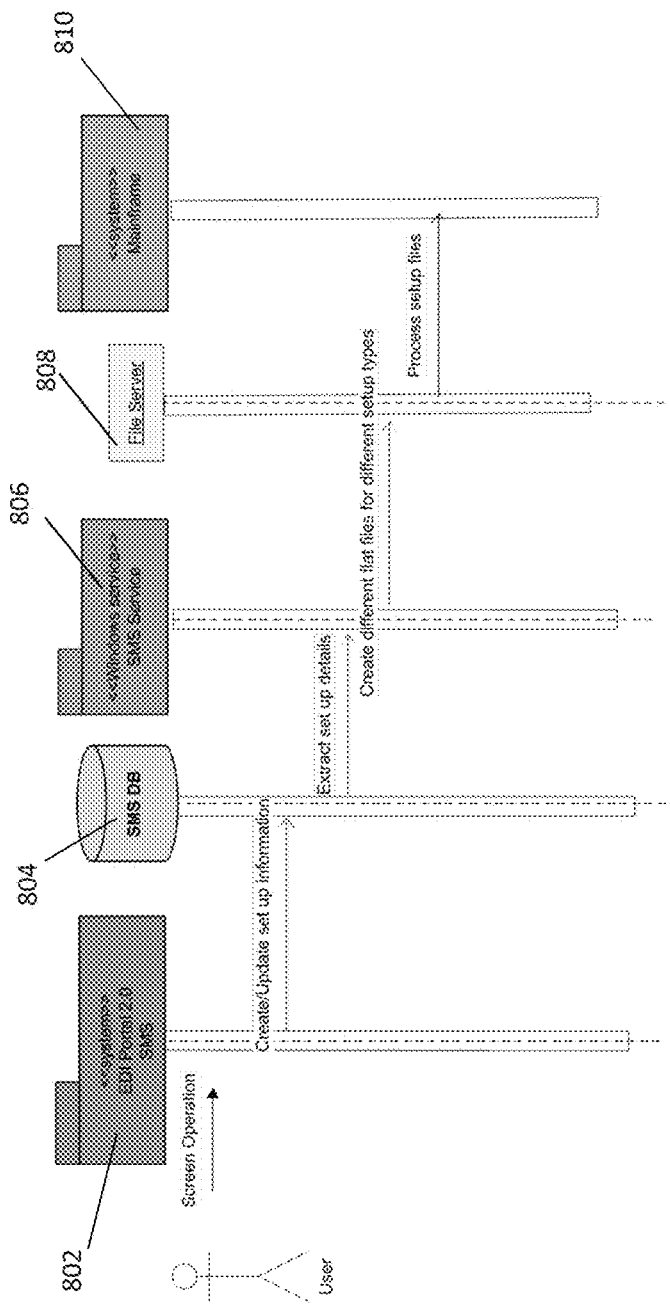
FIG. 8 illustrates extracting data from the EDI portal for the information storage and retrieval system according to an exemplary embodiment of the present disclosure.
Figure 9:
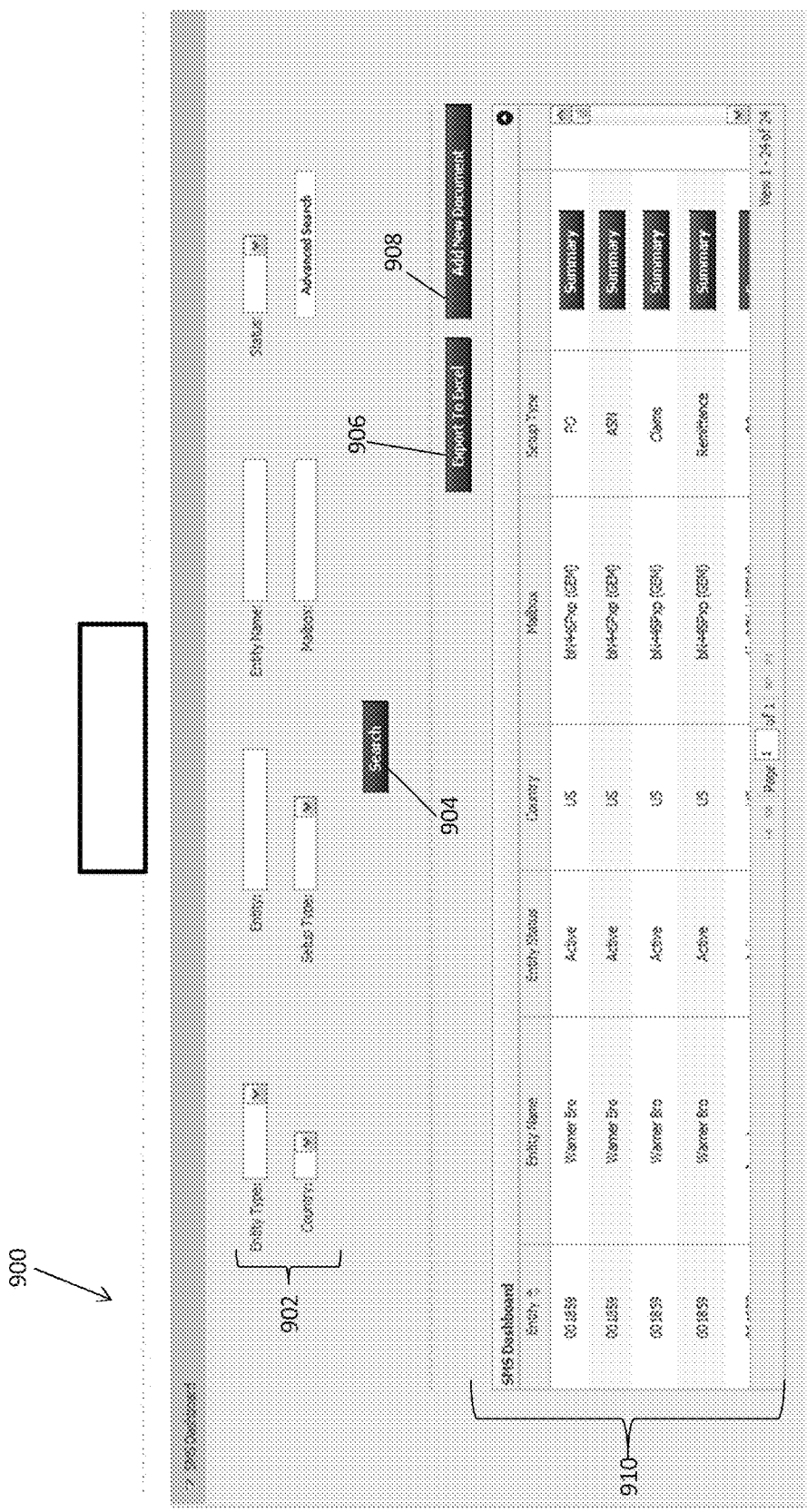
FIGS. 9-17 are graphical user interfaces (GUIs) of the EDI portal for interfacing with the information storage and retrieval system according to an exemplary embodiment of the present disclosure.

FIG. 8 is a download and upload diagram of the EDI portal for interfacing with embodiments of the information storage and retrieval system according to an exemplary embodiment of the present disclosure. In one embodiment, a user can access the EDI portal 802 and create and update any setup information as described with reference to FIG. 2. The information can be stored in the data repository (e.g. data repository 100 as shown in FIGS. 1-2). The data repository in this diagram is embodied as a SMS DB 804. An SMS DB 804 can extract specified entries from the set up information and transmit the specified entries to a SMS service 806. The SMS service 806 can create different flat files for each of the setup types extracted from the specified entries. A flat file can be a plain text file or a binary file. The flat files can be transmitted to a file server 808, which can process the flat files and transmit the flat files to a mainframe 810. It can be appreciated that the flat files can be transmitted to components other than the mainframe 810.

FIGS. 9-17 are exemplary graphical user interface (GUI) of the EDI portal according to an exemplary embodiment of the present disclosure. With respect to FIG. 9, a user with administrator permissions can access the search page 900 of the EDI portal. The search page 900 can include search criteria 902, a search button 904, an advanced search button 905, an export to excel button 906, and add new document button 908. The search results can be displayed in an embedded window 910 within the search page 900.

A user can input information in the search entry input boxes. The search entry input boxes can include entity type, country, entity, setup type, entity name, mailbox, status. The user can input information in one, some or all of the search entry input boxes. In response to selecting the search button 904, the search page 900 can transmit the entries in the search entry input boxes to the data repository management system (e.g. data repository management system 200 as shown in FIG. 2). The data repository management system can query the data repository (e.g. data repository 100 as shown in FIGS. 1-2). The data repository management system 200 can retrieve any third party information from the master self-referential table from the data repository based on the received entries. The data repository management system can retrieve EDI documents type based on the hierarchy, the third party information from the child table, and the columns defined in the first and second sub-child tables, based on the received entries. The search page 900 can display the retrieved third party information, EDI document types and information associated with the EDI documents, based on the search entries, in the embedded window 910. The embedded window can include a Summary button next to each search result. In response to clicking the search button, the search page 900 can display data requests and responses associated with the EDI document, retrieved from the first and second sub-child tables by the data repository management system.

Figure 10:
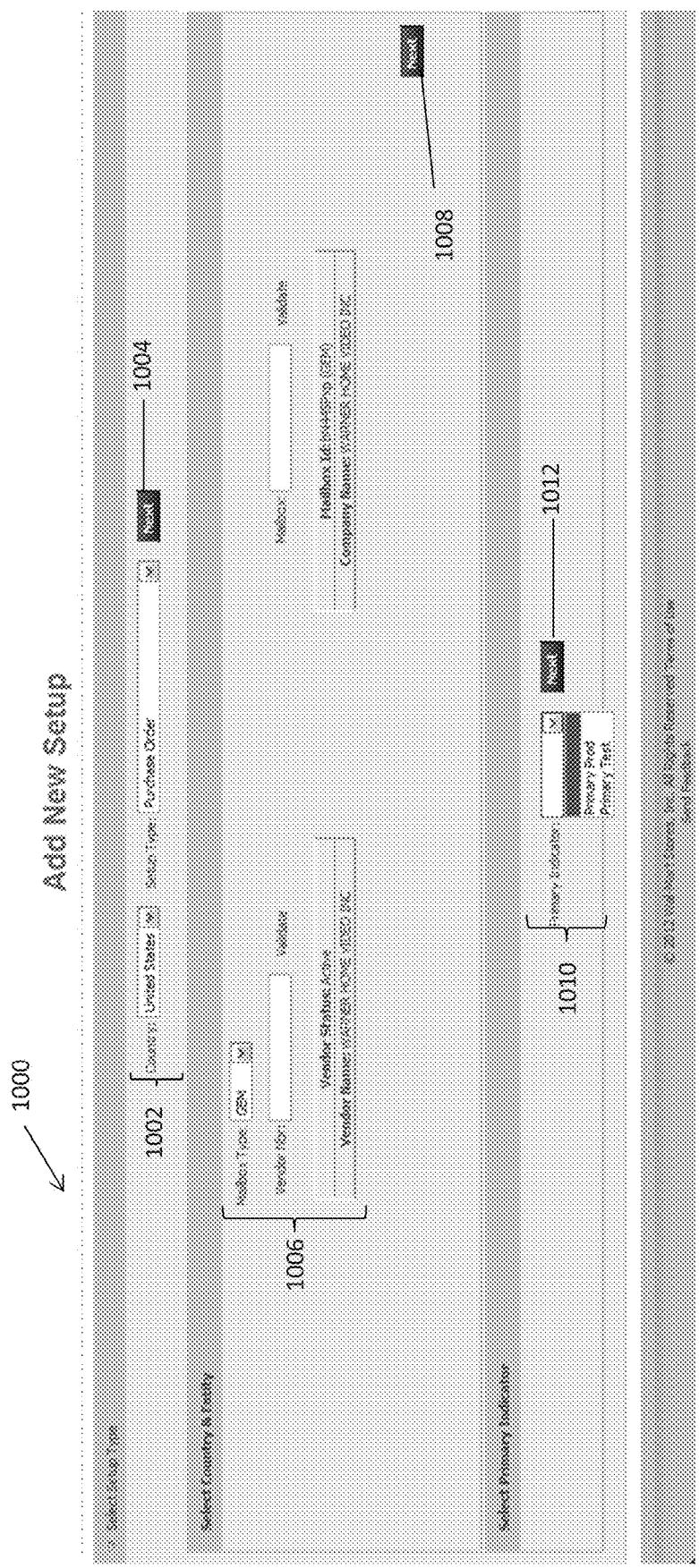

With reference to FIG. 10, a third party system (e.g. third party system 240 as shown in FIG. 2) can access an add new setup page 1000. The add new set up page can include input boxes for information associated with the EDI document type 1002, a first next button 1004, input boxes for information associated with the third party system 1006, a second next button, a primary indicator dropdown 1010, and a third next button 1012.

A third party system can initiate the process of adding a new setup by selecting a country and an EDI document type in the input boxes for the information associated with the EDI document type 1002. The third party system can move forward by selecting the first next button 1004. In response to selecting the first next button, the add new setup page 1000 can prompt the third party system to input information associated with the third party system, for example, mailbox type, vendor number, mailbox. Validate links disposed adjacent to the input boxes for the vendor number and mailbox. In response to selecting the validate links, the information associated with the third party system can be displayed beneath the input boxes for the vendor number and mailbox. The third party system can select the second next button 1008. In response to selecting the second next button, the add new setup page can be prompted to select whether the new setup is a Primary Production or Primary Test in the primary indicator dropdown 1010. The third party system can select an option and select the third next button 1012. In response to selecting the third next button 1012, the add new setup page 1000 can transmit the information associated with the third party system and the EDI document type to the data repository management system (e.g. data repository management system 200 as shown in FIG. 2).

Figure 11:
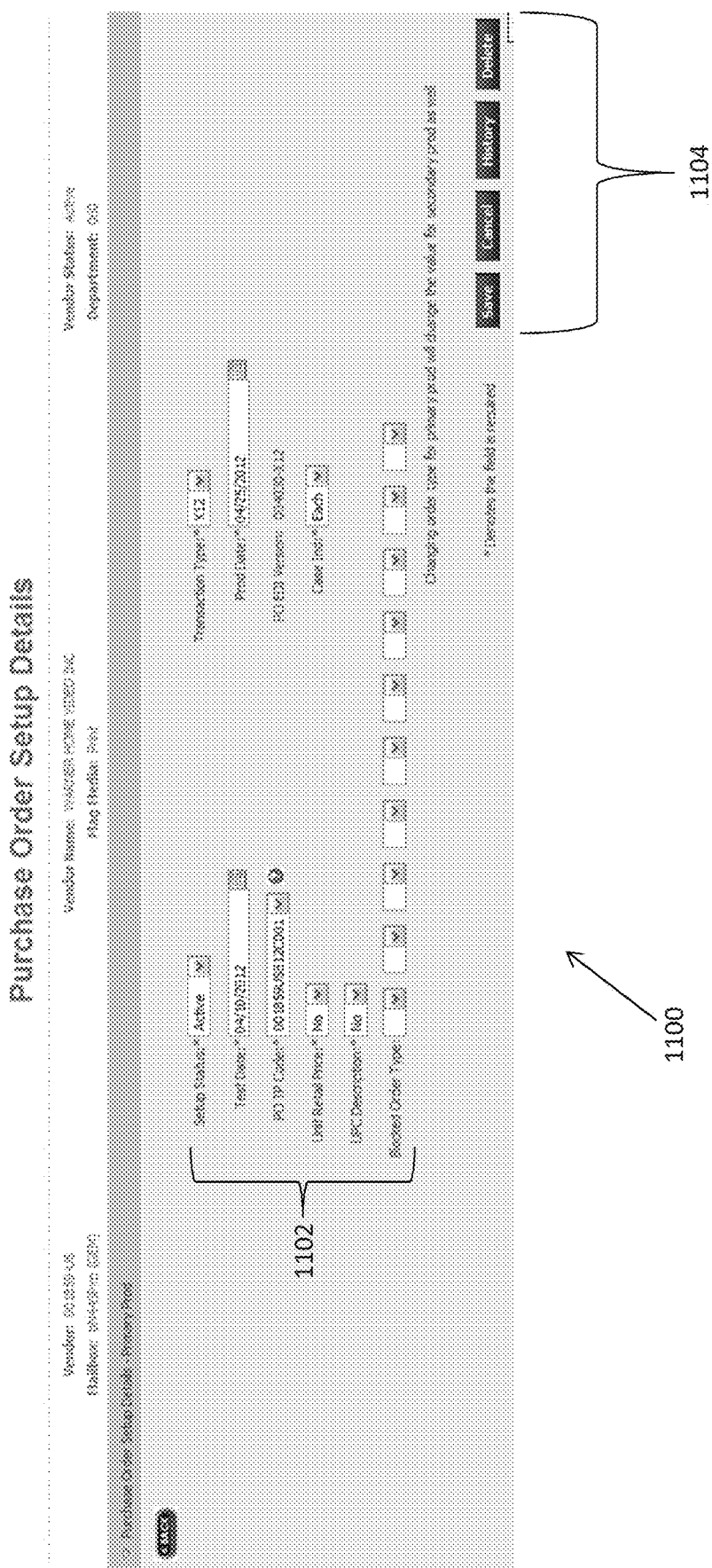

The data repository management system 200 can store the information associated with the third party system in the master self-referential table of the data repository (e.g. data repository 100 as shown in FIGS. 1-2) and the EDI document type in the child table referencing the master self-referential table. With reference to FIG. 11, the data repository management system can query the first sub-child table in the data repository to retrieve data requests based on the information associated with the third party system and the EDI document type. Furthermore, the data repository management system can query the second sub-child table in the data repository to retrieve data responses based on the information associated with the third party system and the EDI document type. The setup details page 1100 can display the data requests and data responses 1102, retrieved by the data repository management system. The setup details page 1100 can also include selection buttons 1104. The selection buttons 1104 can include a save button, a cancel button, a history button, a delete button. In response to selecting the save button, the setup details page 1100 can transmit the selected data requests and data responses to the data repository management system. The data repository management system can generate a row to store the data requests in the first sub-child table in the data repository and associate the data requests to the information associated with the third party system in the master self-referential repository table and the EDI document type stored in the child table. The data repository management system can generate a row to store the data requests in the second sub-child table and associate the data responses to the information associated with the third party system in the master self-referential repository table and the EDI document type stored in the child table.

In response to selecting the Cancel or Delete button, the third party can cancel or remove the new setup information. In response to selecting the History button, the third party system can retrieve historical data which was input associated with the third party system and/or the EDI document type.

Figure 12:
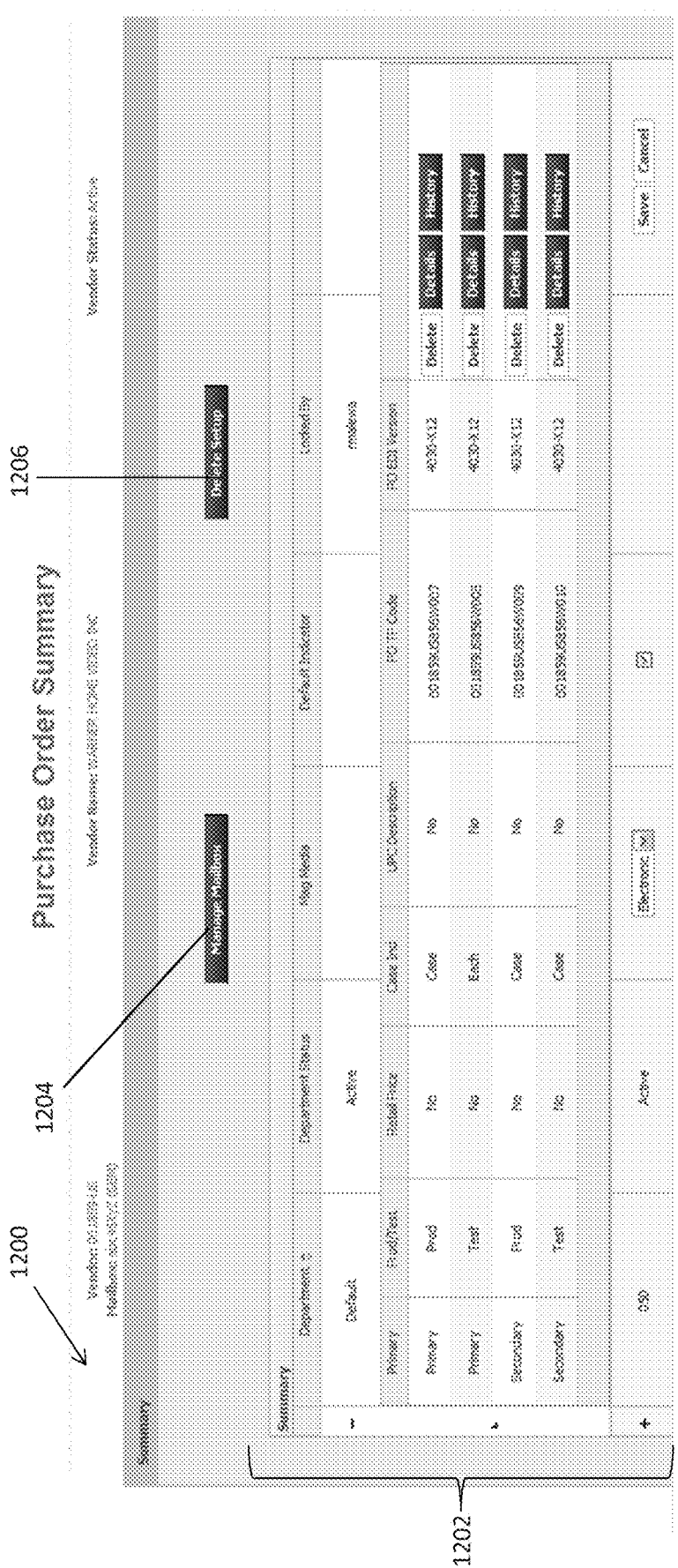

With respect to FIG. 12, the summary page 1200 can display a summary of all of setups for a specified EDI document types for a specified third party system. The summary page 1200 can include an summary window 1202, a manage mailbox button 1204 and a delete setup button 1206. The summary window 1202 can display information associated with each setup for a particular EDI document type and third party system. The user can view details associated with each of the setups by selecting the details button. The user can delete the setup by selecting the delete button included in the summary window 1202 or by selecting the delete set up button 1206. The user can view the history of a setup by selecting the history button.

In response to selecting the details button, the summary page 1200 can transmit a request to the data repository management system to retrieve the details of the setup from the data repository. The data repository management system can query the master self-referential table, the child table, the first sub-child table, and the second sub-child table in the data repository to retrieve the details of the setup. In response to selecting the delete button, the summary page 1200 can transmit a request to the data repository management system to delete the rows associated with the setup in the master self-referential table, the child table, the first sub-child table, and the second sub-child table in the data repository.

With reference to FIGS. 10-12, the screenshots display information associated with a Purchase Order document, however, it can be appreciated the GUI displayed by the EDI portal can be implemented with invoices, ASNs, REACT documents, SAMS documents, RPO SAMS documents, Product Activity documents, and Product Activity in Warehouses documents.

Figure 13:
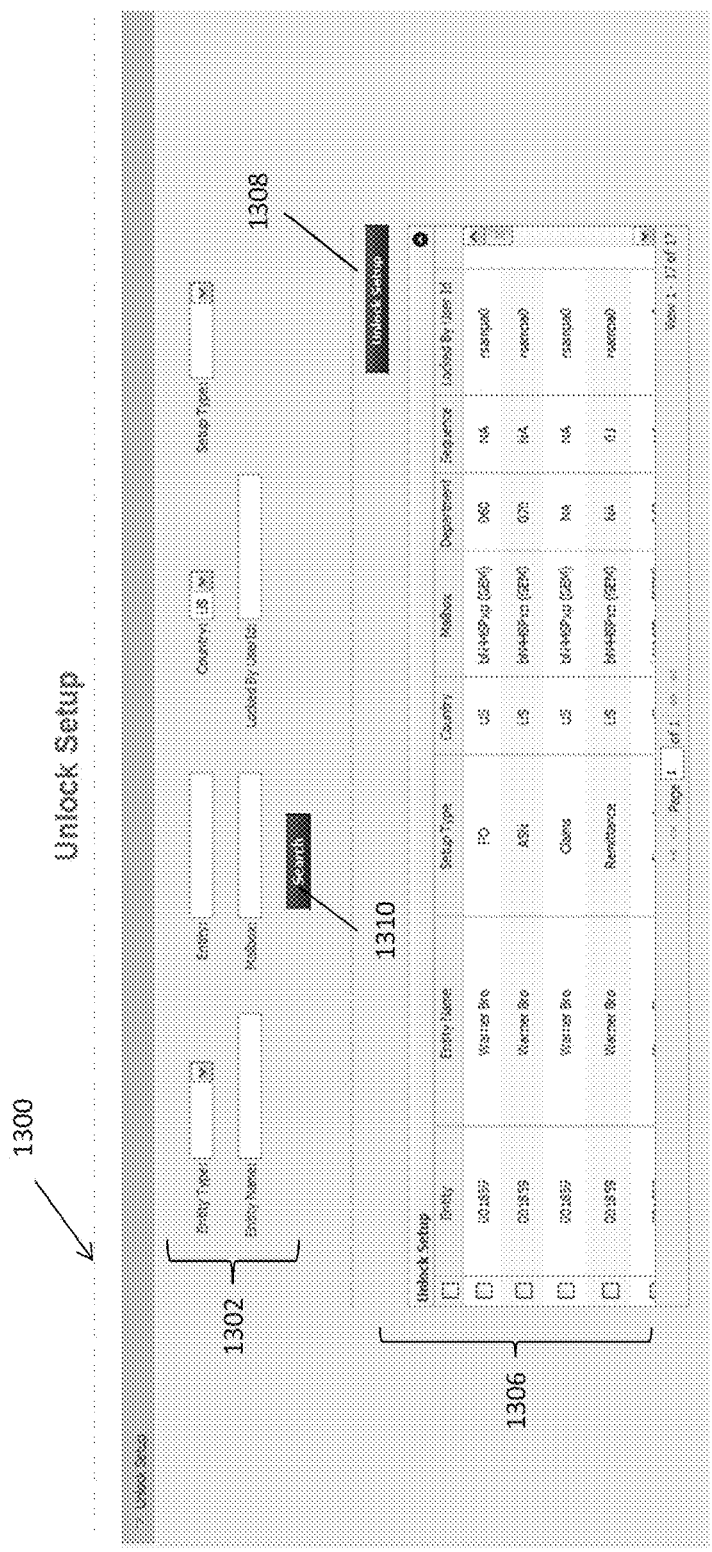

With reference to FIG. 13, an unlock setup page 1300 can display locked setups. In some embodiments, permissions associated with the rows in the data repository storing information associated with the setups can be configured to read-only, making the rows un-editable. The unlock setup page 1300 can include search input boxes 1302, a search button 1304, an embedded window 1306 displaying the search results, and an unlock setup button 1308. A user can search for locked setups by inputting information in the search input boxes 1302. The user can input information in one, some or all of the search input boxes 1302. The user can select search using the search button 1302. In response to the selection of the search button 1302, the information input in the search input boxes 1302 can be transmitted to the data repository management system. The data repository management system can query un-editable (read-only) setups based on the data repository using the search criteria associated with the information received from the unlock setup page 1300. The unlock setup page 1300 can display the search results in the embedded window 1306. The user can select certain setups to unlock within the embedded window 1306 and select the unlock setup button 1308. In response to selecting the unlock setup button 1308, the unlock setup page 1300 can transmit information associated with the selected setups to the data repository management system. The data repository management system can edit permissions associated with the rows of the data repository associated with the selected setups to make the rows editable (read and write permissions).

Figure 14:
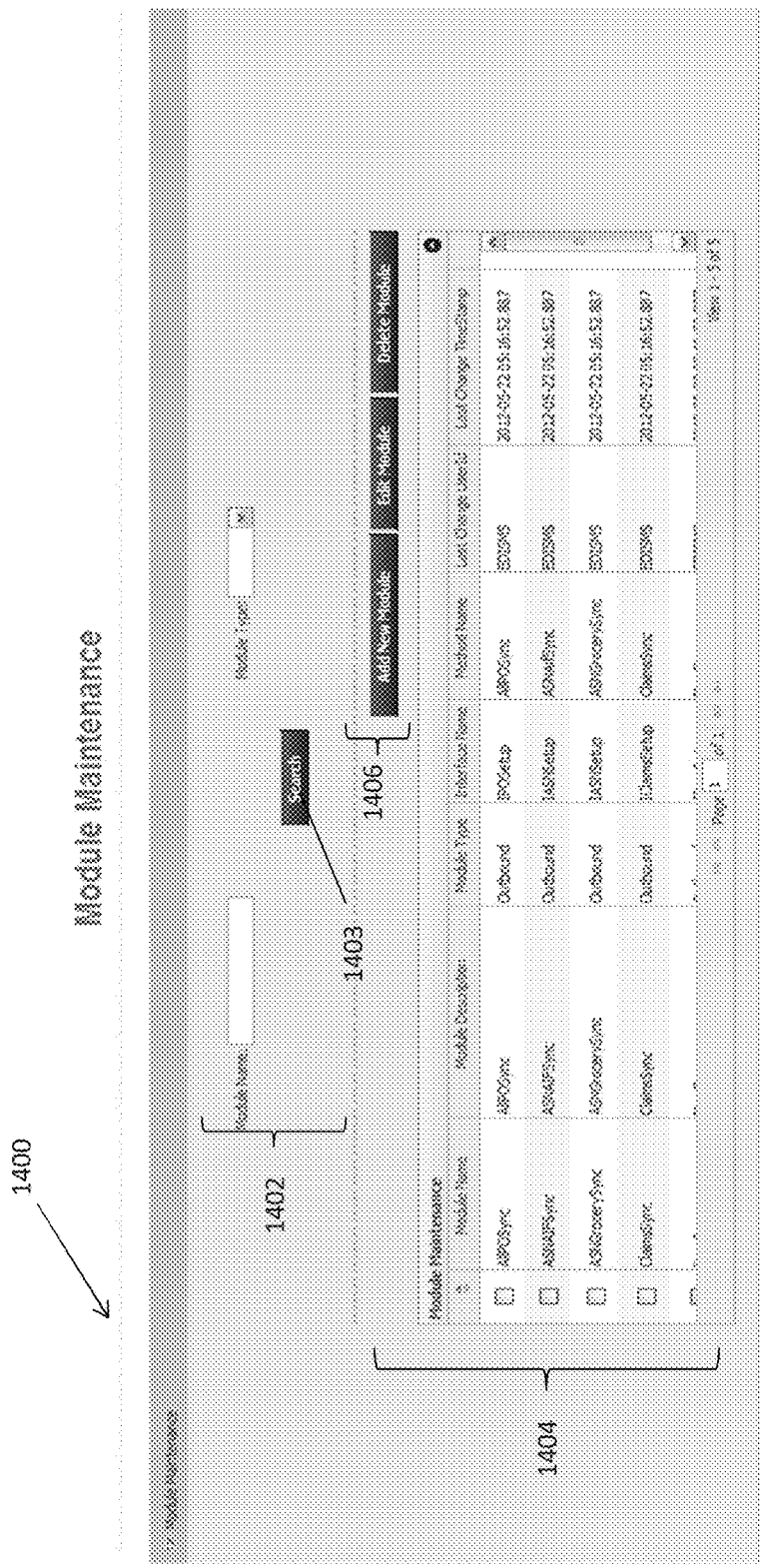

With reference to FIG. 14, a module maintenance page 1400 can display modules of the EDI portal that may require maintenance. Modules can be searched using the search input boxes 1402 and by selecting the search button 1403. The search results can be displayed in an embedded window 1404. The modules search results can be selected within the embedded window 1404. The user can select several buttons 1406 including, add a new module, edit a module, and delete a module to execute actions associated with the selected modules.

Figure 15:
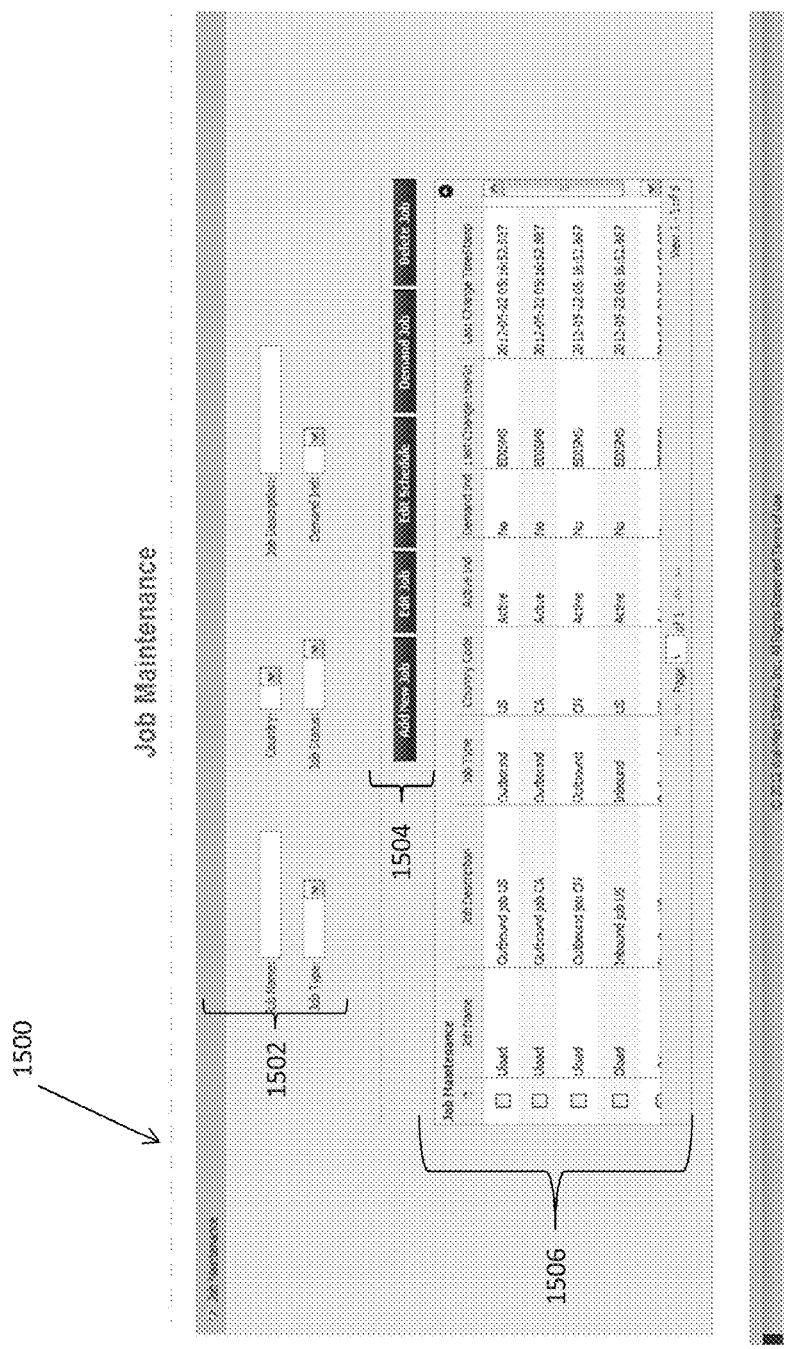

With reference to FIG. 15, a job maintenance page 1500 can display modules of the EDI portal that may require maintenance. Jobs can be searched using the search input boxes 1502. The search results can be displayed in an embedded window 1504. The jobs in the search results can be selected within the embedded window 1504. The user can select several buttons 1506 including, add a new job, edit a job, edit schedule, demand a job, delete a job, to execute actions associated with the selected jobs.

Figure 16:
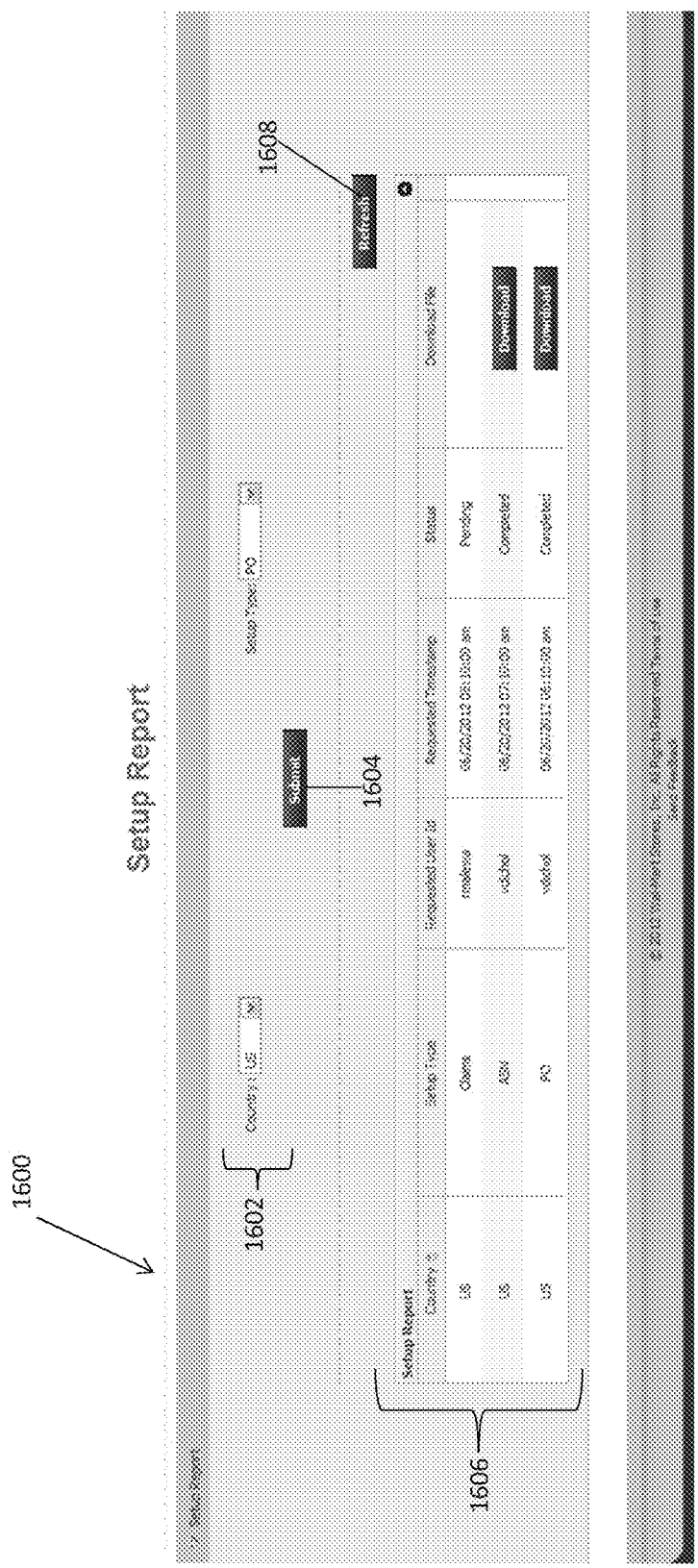

With reference to FIG. 16, setup report page 1600 can display reports associated with setups. Reports can be searched using the search input boxes 1602 (i.e. country and EDI document type) and by selecting the submit button 1604. The information associated with the generated reports can be displayed in an embedded window 1606. A user can download the reports by selecting the download button within the embedded window 1606. The user can refresh the information in the reports by selecting the refresh button 1608.

Figure 17:
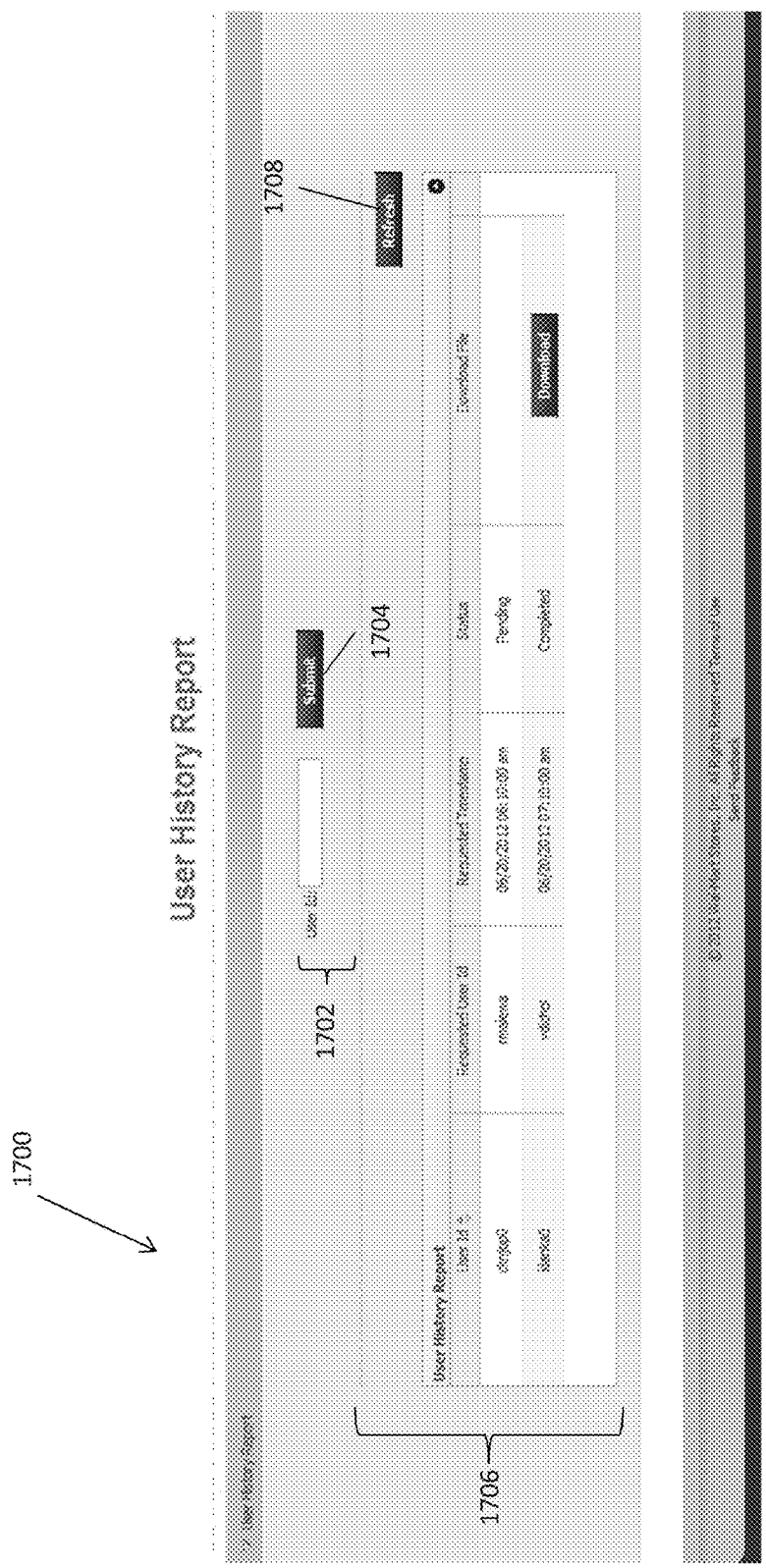

With reference to FIG. 17, a user report 1600 can display reports associated with user history accessing the EDI portal. Reports can be searched using the search input boxes 1702 (i.e. User Id) and by selecting the submit button 1704. The information associated with the generated reports can be displayed in an embedded window 1706. A user can download the reports by selecting the download button within the embedded window 1706. The user can refresh the reports by selecting the refresh button 1708.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The invention claimed is:

1. An information storage and retrieval system for an Electronic Document Interchange (EDI) environment, the system comprising:
a hardware processor;
a data repository including:
a master self-referential table defining a hierarchy for the data repository, the master self-referential table including plurality of rows, each row corresponding to at least one of a plurality of third party systems;
a child table, the child table references the master-self relational table and is configured to store a plurality of EDI document types corresponding to each the plurality of third party systems;
a first sub-child table, the first sub-child table references the child table and is configured to store a plurality of data requests corresponding to each of the plurality of EDI document types and each of the plurality of third party systems; and
a second sub-child table, the second sub-child table references the child table and is configured to store a plurality of data responses corresponding to each of the EDI document types and each of the plurality of third party systems, and a data repository management system, operatively coupled to the data repository, configured to:
receive, from at least one third party system, at least one EDI document type, information associated with the third party system, a first set of data requests and a first set of data responses;
generate a row in the master self-relational table to store the information associated with the third party system;
correlate the at least one EDI document type of the plurality of EDI document types stored in the child table, with the third party information;
associate the first set of data requests of the plurality of data requests stored in the first sub-child table with the at least one EDI document type and the at least one third party information to define columns in the first sub-child table; and
associated the first set of data responses of the plurality of data responses stored in the second sub-child table with the at least one EDI document type and the at least one third party information to define columns in the second sub-child table.

2. The system of claim 1, wherein the data repository management system is further configured to:
receive a request for the at least one EDI document type from the at least one third party system;
retrieve the third party information from the master self-referential table;
retrieve the at least one EDI document type based on the hierarchy, the third party information from the child table, and the columns defined in the first and second sub-child tables;
retrieve the first set of data requests associated with at least one EDI document type and the at least one third party information from the first sub-child table; and
retrieve the first set of data responses associated with at least one EDI document type and the at least one third party information from the second sub-child table.

3. The system of claim 1, wherein in response to associating the first set of data responses the at least one EDI document type and the at least one third party information, the data repository management system is configured to determine a second set of data responses of the plurality of data responses necessitated by the first set of data responses, and associating the second set of data responses with the at least one EDI document type and the at least one third party information.

4. The system of claim 1, wherein in response to associating the first set of data requests the at least one EDI document type and the at least one third party information, the data repository is configured to determine a second set of data requests of the plurality of data requests necessitated by the first set of data responses, and associating the second set of data requests with the at least one EDI document type and the at least one third party information.

5. The system of claim 1, wherein in response to associating the first set of data requests the at least one EDI document type and the at least one third party information, the data repository is configured to determine a second set of data responses necessitated by the first set of data requests, and associating the second set of data responses with the at least one EDI document type and the at least one third party information.

6. The system of claim 1, wherein in response to associating the first set of data responses the at least one EDI document type and the at least one third party information, the data repository is configured to determine a second set of data requests necessitated by the first set of data responses, and associating the second set of data requests with the at least one EDI document type and the at least one third party information.

7. The system of claim 2, further comprising a central computing system operatively coupled to the data repository, the central computing system configured to:
   render one or more graphical user interfaces on the at least one third party system.

8. The system of claim 7, wherein data repository is configured to receive the at least one EDI document type, the information associated with the third party system, the first set of data requests and the first set of data responses, via the one or more graphical user interfaces.

9. The system of claim 8, wherein the central computing system renders the retrieved first set of data requests and responses on the one or more graphical user interfaces.

10. The system of claim 1, wherein the data repository is configured to:
    receive a query;
    retrieve data associated with the query based on the hierarchy and the columns defined in the first and second sub-child tables; and
    generate a file storing the retrieved data.

11. A method implemented in an information storage and retrieval system comprising a hardware processor for an Electronic Document Interchange (EDI) environment, the method comprising:
    receiving, via a data repository management system operatively coupled to a data repository including a master self-referential table defining a hierarchy for the data repository, the master self-referential table including plurality of rows, each row corresponding to at least one of a plurality of third party systems, a child table, the child table references the master-self relational table and is configured to store a plurality of EDI document types corresponding to each the plurality of third party systems, a first sub-child table, the first sub-child table references the child table and is configured to store a plurality of data requests corresponding to each of the plurality of EDI document types and each of the plurality of third party systems and a second sub-child table, the second sub-child table references the child table and is configured to store a plurality of data responses corresponding to each of the EDI document types and each of the plurality of third party systems, from at least one third party system, at least one EDI document type, information associated with the third party system, a first set of data requests and a first set of data responses;

generating, via the data repository management system, a row in the master self-relational table to store the information associated with the third party system;
    correlating, via the data repository management system, the at least one EDI document type of the plurality of EDI document types stored in the child table, with the third party information;
    associating, via the data repository management system, the first set of data requests of the plurality of data requests stored in the first sub-child table with the at least one EDI document type and the at least one third party information to define columns in the first sub-child table; and
    associating, via the data repository management system, the first set of data responses of the plurality of data responses stored in the second sub-child table with the at least one EDI document type and the at least one third party information to define columns in the second sub-child table.

12. The method of claim 11, further configured to:
    receiving, via the data repository management system, a request for the at least one EDI document type from the at least one third party system;
    retrieving, via the data repository management system, the third party information from the master self-referential table;
    retrieving, via the data repository management system, the at least one EDI document type based on the hierarchy, the third party information from the child table, and the columns defined in the first and second sub-child tables;
    retrieving, via the data repository management system, the first set of data requests associated with at least one EDI document type and the at least one third party information from the first sub-child table; and
    retrieving, via the data repository management system, the first set of data responses associated with at least one EDI document type and the at least one third party information from the second sub-child table.

13. The method of claim 11, further comprising:
    in response to associating the first set of data responses the at least one EDI document type and the at least one third party information,
    determining, via the data repository management system, a second set of data responses of the plurality of data responses necessitated by the first set of data responses; and
    associating, via the data repository management system, the second set of data responses with the at least one EDI document type and the at least one third party information.

14. The method of claim 11, further comprising:
    in response to associating the first set of data requests the at least one EDI document type and the at least one third party information,
    determining, via the data repository management system, a second set of data requests of the plurality of data requests necessitated by the first set of data responses; and
    associating, via the data repository management system, the second set of data requests with the at least one EDI document type and the at least one third party information.

15. The method of claim 11, further comprising:
    in response to associating the first set of data requests the at least one EDI document type and the at least one third party information, determining, via the data repository management system, a second set of data responses necessitated by the first set of data requests; and associating, via the data repository management system, the second set of data responses with the at least one EDI document type and the at least one third party information.

16. The method of claim 11, further comprising:

in response to associating the first set of data responses the at least one EDI document type and the at least one third party information, determining, via the data repository management system, a second set of data requests necessitated by the first set of data responses; and associating, via the data repository management system, the second set of data requests with the at least one EDI document type and the at least one third party information.

17. The method of claim 12, further comprising:

rendering, via the data repository management system, one or more graphical user interfaces on the at least one third party system.

18. The method of claim 17, wherein the data repository management system, is configured to receive the at least one EDI document type, the information associated with the third party system, the first set of data requests and the first set of data responses, via the one or more graphical user interfaces.

19. The method of claim 18, further comprising rendering, via the data repository management system, the retrieved first set of data requests and responses on the one or more graphical user interfaces.

20. The method of claim 11, further comprising:

receiving, via the data repository management system, a query;

retrieving, via the data repository management system, data associated with the query based on the hierarchy and the columns defined in the first and second sub-child tables; and generating, via the data repository management system, a file storing the retrieved data.

* * * * *